(12) United States Patent
Yamato et al.

(10) Patent No.: US 7,125,598 B2
(45) Date of Patent: Oct. 24, 2006

(54) MOLDED FLUOROELASTOMER WITH EXCELLENT DETACHABILITY AND PROCESS FOR PRODUCING THE SAME

(75) Inventors: Takafumi Yamato, Settsu (JP); Katsuhiko Higashino, Settsu (JP); Hiroyuki Tanaka, Settsu (JP); Tsuyoshi Noguchi, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 43 days.

(21) Appl. No.: 10/258,066

(22) PCT Filed: Apr. 19, 2001

(86) PCT No.: PCT/JP01/03338

§ 371 (c)(1),
(2), (4) Date: Oct. 18, 2002

(87) PCT Pub. No.: WO01/79337

PCT Pub. Date: Oct. 25, 2001

(65) Prior Publication Data

US 2003/0180503 A1 Sep. 25, 2003

(30) Foreign Application Priority Data

Apr. 19, 2000 (JP) .......................... 2000-118654

(51) Int. Cl.
*D06N 7/04* (2006.01)
(52) U.S. Cl. .................. 428/141; 428/195.1; 524/544; 524/545; 524/546
(58) Field of Classification Search ........ 524/543–546; 428/141, 195, 195.1
See application file for complete search history.

(56) References Cited

U.S. PATENT DOCUMENTS 5,718,957 A * 2/1998 Yokoe et al. ............ 428/36.91
5,883,197 A * 3/1999 Barbieri et al. ............ 525/340
6,113,830 A * 9/2000 Chen et al. ................. 264/241
6,329,042 B1 * 12/2001 Yamada et al. .......... 428/195.1
6,451,903 B1 * 9/2002 Asano et al. ............... 524/546

FOREIGN PATENT DOCUMENTS

| DE | 197 40 097 A1 | 3/1999 |
|---|---|---|
| EP | 05230436 | 9/1993 |
| EP | 0 969 035 A1 | 1/2000 |
| JP | 58-128835 | 8/1983 |
| JP | 3-290442 | 12/1991 |
| JP | 5-271448 A | 10/1993 |
| JP | 5-320365 | 12/1993 |
| JP | 6-263897 | 9/1994 |
| JP | 7-145253 | 6/1995 |
| JP | 2001-172440 | 6/2001 |
| WO | WO 00/64980 A1 | 11/2000 |

OTHER PUBLICATIONS

Supplementary Partial European Search Report for EP 01 92 1900 dated May 7, 2003.
International Preliminary Examination Report for PCT/JP01/03338 dated Mar. 6. 2002.
Patent Abstract of Japan, vol. 011, No. 273 (C-445), Sep. 4, 1987 & JP 62 074948 A (Daikin Ind Ltd), Apr. 6, 1987.
Patent Abstracts of Japan, vol. 017, No. 689 (C-1143), Dec 16, 1993 & JP 05 230436 A (Japan Synthetic Tubber Co Ltd), Sep. 7, 1993.

\* cited by examiner

*Primary Examiner*—William P. Watkins, III
*Assistant Examiner*—Patricia L. Nordmeyer
(74) *Attorney, Agent, or Firm*—Sughrue Mion, PLLC

(57) ABSTRACT

There is provided a fluorine-containing elastomer molded article which is obtained by irradiating the fluorine-containing elastomer molded article with a plasma and has a center line average roughness of not less than 0.65 μm or a fluorine-containing elastomer molded article which is obtained by applying a resin coating layer on a fluorine-containing elastomer substrate, has a small peeling strength and a small etching rate at the irradiation of plasma and is excellent in detachability and whiteness. There is provided particularly a molded article suitable as various sealing materials for semiconductor production apparatuses.

19 Claims, No Drawings

MOLDED FLUOROELASTOMER WITH EXCELLENT DETACHABILITY AND PROCESS FOR PRODUCING THE SAME

TECHNICAL FIELD

The present invention relates to a fluorine-containing elastomer molded article having a surface excellent in detachability, and particularly relates to a sealing material.

BACKGROUND ART

Fluorine-containing elastomers are used for a molded article which is used under tough conditions because of their excellent heat resistance, plasma resistance and corrosive gas resistance. Examples of such a molded article are sealing materials such as O-ring and gasket which are required to have elastomeric property, and those molded articles are used in a state of being always compressed.

When the sealing material is kept in the compressed state for a long period of time, there is a case where the sealing material sticks to a surface of a device to be sealed and is difficult to be separated therefrom and in an extreme case, a part of the sealing material sticks to and remains on the surface of the device to be sealed.

Improvement of peeling property of a fluorine-containing elastomer (rubber) is handled particularly as a problem with releasing property and blocking property when removing from a metal mold. For example, JP-B-7-94582 proposes that a diphenyl compound is added to an elastomer so as to bleed on a surface of the elastomer.

A sticking property of a molded article itself of a fluorine-containing elastomer is referred to in JP-B-63-65703. However mentioned therein is a method of eliminating impurities (un-reacted product) by heat-treating the elastomer under reduced pressure before crosslinking. The obtained fluorine-containing elastomer molded article has a certain degree of releasing property (property to prevent sticking, that is, detachability), but in case of use for a sealing material which is required to have a high sealing property in a state of always being compressed under a high load, it becomes difficult to detach the sealing material.

In case of use as parts for devices such as semiconductor production apparatuses which are required to be free from contamination materials and micro-particles, a metal mold having a smooth surface is used for a fluorine-containing elastomer (fluorine-containing rubber) molded article or the molded article is subjected to coating with silicone on its surface, thereby making the surface of the molded article as smooth as possible.

As a result, fluorine-containing elastomer molded articles which are used for semiconductor production apparatuses have a relatively smooth surface having a center line average roughness of less than 0.60 µm.

In a sealing material particularly required to have a high sealing property, it has been considered that a sealing material having smoother surface is preferred from the viewpoint of sealing performance.

The inventors of the present invention changed a conventional way of thinking and made other approach than such conventional methods as addition or removal of chemical substances, and thus have found that when a surface of a fluorine-containing elastomer molded article is roughened to not less than a certain degree, its detachability can be improved without lowering its sealing property and have completed the first invention.

Also coating of a surface of an elastomer molded article has been proposed as an another approach for improving detachability. For example, JP-A-5-271448 describes a proposal that a surface of a fluorine-containing rubber is coated with a thermosetting resin layer (layer thickness: not more than 10 µm) having functional group and having heat resistance of not less than 200° C. such as a novolak phenol resin or a polyimide prepared by using a specific acid anhydride.

However when the coated molded article described in the above publication is used as a molded article such as a sealing material for a plasma irradiation device for production of semiconductor, it cannot stand strict environment and its durability is insufficient.

The inventors of the present invention have challenged an approach aiming at a coated molded article and have found that when an oxygen ($O_2$) plasma etching rate is not more than 13 nm/sec in case of plasma irradiation under specific irradiation conditions, the molded article has a particularly excellent durability and thus have completed the second invention.

DISCLOSURE OF INVENTION

Namely the first invention relates to a fluorine-containing elastomer molded article having a surface center line average roughness Ra of not less than 0.65 µm, and particularly relates to a sealing material for semiconductor production apparatuses which is used in a compressed state.

The molded article of the present invention has an excellent property, namely a peeling strength of not more than 200 gf/10 mm measured under the following Conditions (1).

Conditions (1)

A sample molded article of 2 mm thick×10 mm wide×60 mm long is put between two stainless steel metal plates and a load is uniformly applied thereto, followed by allowing to stand at 150° C. for 72 hours in a state that the thickness of the molded article is compressed to 81.5%, and then air cooling in the compressed state. Then the molded article is separated from the metal plate at a rate of 2 mm/min and a peeling strength at that time is measured.

In order to easily remove only one metal plate from the molded article after the compressing, a fluorine-containing resin sheet or film for releasing is put between the molded article and the metal plate to be removed, or a releasing layer is formed on the metal plate.

A preferred fluorine-containing elastomer to be used is a copolymer of tetrafluoroethylene and perfluoro(alkyl vinyl ether), and a white filler may be added thereto.

The fluorine-containing elastomer molded article of the present invention can be produced by irradiating the fluorine-containing elastomer molded article with a plasma, preferably an oxygen plasma.

The second invention relates to a fluorine-containing elastomer molded article comprising a fluorine-containing elastomer substrate and a coating layer coated on a surface of the substrate, in which the surface coating layer has a peeling strength of not more than 200 gf/10 mm measured under the above-mentioned Conditions (1) and has an oxygen ($O_2$) plasma etching rate of not more than 13 nm/sec when oxygen plasma irradiation is carried out under the following Conditions (2).

Conditions (2)

Irradiation Conditions:
Oxygen (O₂) plasma irradiation treatment
  Gas flow: 16 sccm
  RF output: 800 W
  Pressure: 20 mTorr
  Frequency: 13.56 MHz Irradiation Operation:

In order to stabilize an atmosphere in a chamber of a plasma irradiation device, actual gas discharge is carried out for five minutes as a pre-treatment of the chamber. Then a sample molded article is disposed around a center of RF electrode, and is irradiated under the above-mentioned irradiation conditions.

Measurement of Etching Rate:

An amount of weight reduction per unit area is measured up to two decimals (0.01 mg) with an electronic balance, and is round to one decimal. The measured amount of weight reduction per unit area is substituted for the following equation to calculate an etching rate.

Etching rate (nm/sec) =

Amount of weight reduction per unit area (g/cm²) ÷

Specific weight of a resin to be coated(g/cm³) ÷

Plasma irradiation time (sec) × 10⁷

Sample Molded Article:
  O-ring (AS-568A-214)

It is preferable that the surface coating layer is a resin layer which has a thickness of not more than 50 μm and is formed using a resin having heat resistance of not less than 200° C. Further an adhesive strength between the fluorine-containing elastomer substrate and the surface coating layer may be larger than the above-mentioned peeling strength. Particularly preferred is an adhesive strength larger than 200 gf/cm.

The heat resistance of not less than 200° C. means a property that a molded article is not deteriorated or deformed substantially at 200° C. Concretely in differential scanning calorimetry (DSC), a crystalline resin has a crystalline melting temperature of not less than 200° C. and a resin having only a glass transition temperature (for example, non-crystalline resin) has a glass transition temperature of not less than 200° C. Also in an another aspect it is meant that in a thermogravimetric analysis, a 5% weight reduction temperature is not less than 200° C.

Also plasma resistance is enhanced when the surface coating layer contains at least one filler selected from the group consisting of a metal oxide, metal nitride, metal carbide, halogenated metal, metal sulfide, metal salt and metal hydride.

An excellent adhesive strength can be obtained particularly when a center line average roughness Ra of a surface of the fluorine-containing elastomer substrate where the coating layer is formed is not less than 0.6 μm.

The fluorine-containing elastomer substrate is preferably a substrate obtained from a copolymer comprising tetrafluoroethylene and perfluoro(alkyl vinyl ether). Also it is preferable that the fluorine-containing elastomer substrate contains at least one filler selected from metal fillers such as a metal oxide, metal nitride, metal carbide, halogenated metal, metal sulfide, metal salt and metal hydride and carbon fillers such as a carbon black, graphitized carbon and graphite.

BEST MODE FOR CARRYING OUT THE INVENTION

The molded article of the first invention is a fluorine-containing elastomer molded article having a surface center line average roughness Ra of not less than 0.6 μm.

The fluorine-containing elastomer for the fluorine-containing elastomer molded article of the present invention is not limited particularly as far as the elastomer is one which has been used for a molding material for a sealing material. For example, there are: a copolymer elastomer represented by the formula (1):

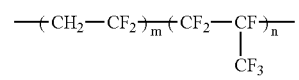

wherein m is from 85 to 60, n is from 15 to 40 in % by mole, hereinafter the same, or the formula (2):

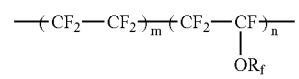

wherein m is from 95 to 50, n is from 5 to 50, $R_f$ is a perfluoroalkyl group having 1 to 8 carbon atoms,
a terpolymer elastomer represented by the formula (3):

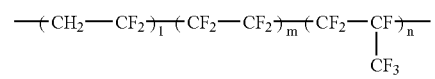

wherein l is from 85 to 20, m is from 0 to 40, n is from 15 to 40,
a terpolymer elastomer represented by the formula (4):

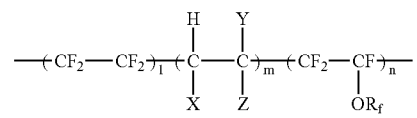

wherein l is from 95 to 45, m is from 0 to 10, n is from 5 to 45, X, Y and Z are independently fluorine atom or hydrogen atom, $R_f$ is a perfluoroalkyl group having 1 to 8 carbon atoms,
a terpolymer elastomer represented by the formula (5):

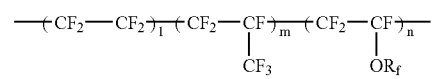

wherein l is from 95 to 35, m is from 0 to 30, n is from 5 to 35, $R_f$ is a perfluoroalkyl group having 1 to 8 carbon atoms, a copolymer elastomer comprising 2 to 4 monomers and represented by the formula (6):

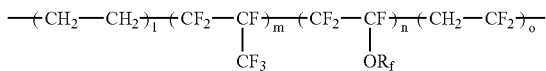

wherein 1 is from 80 to 20, m is from 20 to 80, n is from 0 to 35, o is from 0 to 40, $R_f$ is a perfluoroalkyl group having 1 to 8 carbon atoms, a copolymer elastomer comprising 2 to 4 monomers and represented by the formula (7):

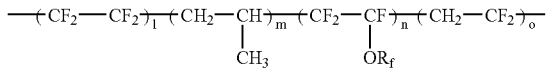

wherein 1 is from 80 to 20, m is from 20 to 80, n is from 0 to 35, o is from 0 to 40, $R_f$ is a perfluoroalkyl group having 1 to 8 carbon atoms and the like. Among them, from the viewpoint of chemical resistance, heat resistance and plasma resistance, it is preferable to use the copolymer elastomer represented by the formula (1) or (2) or the terpolymer elastomer represented by the formula (3).

Further a block copolymer elastomer comprising an elastomeric segment copolymer and a non-elastomeric segment copolymer can be used.

The elastomeric segment represents a segment which is non-crystalline and has a glass transition temperature of not more than 25° C. Preferred components thereof are tetrafluoroethylene (TFE)/perfluoro(alkyl vinyl ether) (PAVE)/a monomer giving a curing site (45 to 90/10 to 50/0 to 5). Proportions thereof are more preferably 45 to 80/20 to 50/0 to 5, particularly preferably 53 to 70/30 to 45/0 to 2.

Examples of the monomer giving a curing site are, for instance, vinylidene fluoride, an iodine-containing monomer represented by $CX_2=CX-R_f^3CHRI$, wherein X is H, F or $CH_3$, $R_f^3$ is a fluoroalkylene group, perfluoroalkylene group, fluoro polyoxyalkylene group or perfluoro polyoxyalkylene group, R is H or $CH_3$, a nitrile group-containing monomer represented by:

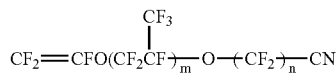

wherein m is from 0 to 5, n is from 1 to 3, a bromine-containing monomer and the like. Usually the iodine-containing monomer and nitrile group-containing monomer are suitable.

Examples of the copolymer of the non-elastomeric segment are:
(1) Vinylidene fluoride (VdF)/TFE (0 to 100/100 to 0), particularly VdF/TFE (70 to 99/30 to 1), polytetrafluoroethylene (PTFE) or polyvinylidene fluoride (PVdF);
(2) Ethylene/TFE/hexafluoropropylene (HFP) (6 to 43/40 to 81/10 to 30), 3,3,3-trifluoropropylene-1,2-trifluoromethyl-3,3,3-trifluoropropylene-1/PAVE (40 to 60/60 to 40);
(3) TFE/$CF_2=CF-R_f^1$ (a proportion exhibiting non-elastomeric property, namely not more than 15% by mole of $CF_2=CF-R_f^1$ in which $R_f^1$ is $CF_3$ or $OR_f^2$ wherein $R_f^2$ is a perfluoroalkyl group having 1 to 5 carbon atoms;
(4) VdF/TFE/chlorotrifluoroethylene (CTFE) (50 to 99/30 to 0/20 to 1);
(5) VdF/TFE/HFP (60 to 99/30 to 0/10 to 1);
(6) Ethylene/TFE (30 to 60/70 to 40);
(7) Polychlorotrifluoroethylene (PCTFE);
(8) Ethylene/CTFE (30 to 60/70 to 40); and the like. Among them, particularly PTFE and the non-elastomeric copolymer of TFE/$CF_2=CF-R_f^1$ are preferred from the viewpoint of chemical resistance and heat resistance.

Those fluorine-containing elastomers are formed into a molded article by adding additives such as a crosslinking agent, crosslinking aid and filler thereto, kneading and molding by a molding method such as compression molding and injection molding.

The crosslinking agent may be optionally selected depending on a crosslinking system, for example, peroxide crosslinking, polyol crosslinking, polyamine crosslinking, triazine crosslinking, oxazole crosslinking, imidazole crosslinking or thiazole crosslinking.

The filler is not limited particularly. In case of a molded article for semiconductor production apparatuses, white fillers, for example, titanium oxide, silicon oxide, aluminum oxide, barium sulfate and the like are preferred.

The so-obtained fluorine-containing elastomer molded article usually has a relatively smooth surface having its center line average roughness of less than 0.60 μm.

The molded article has been so far used as it was or after enhancing its smoothness by surface coating with a silicone resin or the like.

Contrary to that, in the present invention, the molded article is so treated as to increase its surface roughness and its center line average roughness is increased to not less than 0.65 μm. The center line average roughness is preferably not less than 0.70 μm and not more than 5.00 μm, more preferably from 0.70 μm to 3.00 μm. If the roughness is too large, a sealing property is lost.

In the present invention the center line average roughness Ra is measured and calculated according to the method stipulated in JIS standard. More concretely the center line average roughness is calculated from a value obtained by irradiating a surface of a sample with He-Ne laser and detecting reflection light with a surface shape analyzing microscope (VF-7500 available from KEYENCE).

The fluorine-containing elastomer molded article of the present invention subjected to roughening of its surface has a peeling strength measured by the above-mentioned method of not more than 200 gf/10 mm, preferably not more than 190 gf/10 mm, more preferably zero. In examples explained infra, a peeling test device (DCS-50M) available from Shimadzu Corporation is used to measure the peeling strength.

The roughened fluorine-containing elastomer molded article having such an excellent detachability can be obtained, for example, by irradiating the molded article with a plasma after the molding. Examples of the irradiating plasma gas are oxygen gas, nitrogen gas, argon gas, hydrogen gas, carbon tetrafluoride gas, $C_4H_8$ gas, chlorine gas and the like. Among them, oxygen gas is preferred from the point that time for roughening can be shortened and a surface of a molded article is free from deposition of a precipitate.

The plasma irradiation conditions (gas flow, pressure of atmosphere, power of plasma generator, temperature of atmosphere, irradiation time, etc.) vary depending on kind of a plasma, kind of a fluorine-containing elastomer, size and shape of a molded article, etc. Therefore the conditions may be optionally selected so that the center line average roughness of its surface becomes not less than 0.65 μm. Nonlimiting example of the conditions for roughening O-ring (AS568-214) made of TFE-PAVE elastomer with an oxygen plasma is, for instance, a gas flow of from 100 to 300 sccm, a pressure of from 200 to 400 mTorr (from 26.6 to 53.2 Pa), an output of plasma generator of from 300 to 600 W, a temperature of from 25° to 100° C. and an irradiation time of from 15 to 60 minutes. Thus required roughening can be carried out.

By the way, dry etching such as plasma etching is proposed to clean a surface of a molded article though its purpose is different from the purpose of the present invention (WO99/49997 pamphlet). However in that plasma etching for the purpose of cleaning, mild etching treatment is carried out in a short period of time not to lower an original smoothness of the molded article. The etching which causes the center line average roughness to increase to 0.65 μm or more is not carried out.

The thus obtained roughened fluorine-containing elastomer molded article, particularly the molded article subjected to oxygen plasma treatment has surprisingly an excellent whiteness when a white filler is added thereto. Such a result is an unexpected effect and is suitable for parts for semiconductor production apparatuses which are required to have whiteness. A degree of whiteness achieved by the present invention is not less than 70, further not less than 75, particularly not less than 80 in the whiteness W (Lab) of Commission International de Leclairage.

The whiteness W (Lab) is calculated by measuring a reflection of white light source C of Commission International de Leclairage (CIE) with Model SZ-Σ90 color-difference meter system available from Nippon Denshoku Kogyo Kabushiki Kaisha and substituting the obtained Lab value of CIE for the following equation.

$$W(Lab) = 100 - [(100-L)^2 + a^2 + b^2]^{1/2}$$

The whiteness is increased as the value of whiteness W (Lab) approximates to 100.

Then the molded article of the second invention is explained below.

The second invention relates to the fluorine-containing elastomer molded article comprising the fluorine-containing elastomer substrate and a coating layer formed on its surface, in which the peeling strength of the molded article measured under the above-mentioned Conditions (1) is not more than 200 gf/10 mm and the etching rate of the coating layer in case of the O$_2$ plasma irradiation under the above-mentioned Conditions (2) (which may be hereinafter referred to simply as "etching rate") is not more than 13 nm/sec.

The peeling strength is preferably not more than 200 gf/10 mm, more preferably zero like the first invention.

The etching rate approximate to zero is preferred and the etching rate of not more than 13 nm/sec can be evaluated as being excellent from the viewpoint of durability. Particularly preferred etching rate is not more than 10 nm/sec. One of the reasons why an oxygen plasma is used for evaluating durability is that deterioration of a resin used as a coating layer is greater in case of oxygen plasma as compared with other kinds of plasmas. Another reason is that in case of a CF plasma used in plasma etching, deposition of a precipitate occurs which makes it difficult to evaluate durability accurately.

In order to impart such durability (plasma resistance) and detachability (property of preventing sticking and low peeling strength) to the coating film, a resin layer which is formed using a resin having heat resistance of not less than 200° C. and has a thickness of not more than 50 μm is preferred as the coating layer.

The thickness of the coating resin layer is not more than 50 μm, preferably not more than 10 μm because, for example, when the elastomer molded article is used as a sealing material, the coating resin layer is demanded to have deformation which can sufficiently follow the deformation of the fluorine-containing elastomer substrate. On the other hand, it is desirable that the thickness of the coating resin layer is not less than 0.01 μm, preferably not less than 0.5 μm from the viewpoint of not lowering detachability.

The reason why the resin is required to have heat resistance of not less than 200° C. (crystalline melting temperature, glass transition temperature or 5% weight reduction temperature) is that enough durability can be obtained even in case of the use at high temperatures as a sealing material for a high temperature heat treating equipment. It is particularly preferable that heat resistance is not less than 220° C.

Example of the resin having heat resistance of not less than 200° C. is, for instance, a resin having a recurring unit having at least one structure represented by —X— or a resin which has at least one recurring unit having at least one structural unit represented by —X— and at least one recurring unit having at least one structural unit represented by —Y—, respectively.

Examples of the structural unit —X— are:

single carbon rings such as

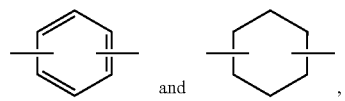

condensed carbon rings such as

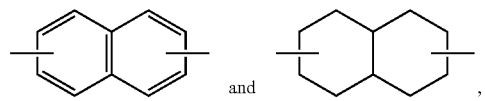

single heterocyclic rings such as

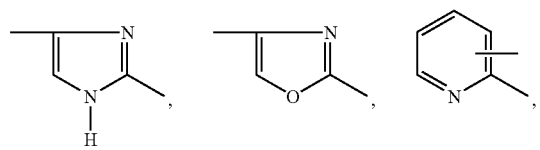

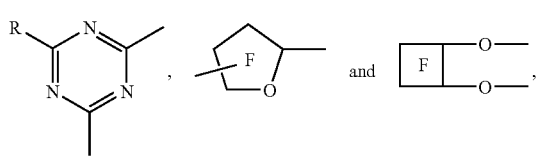

condensed heterocyclic rings such as

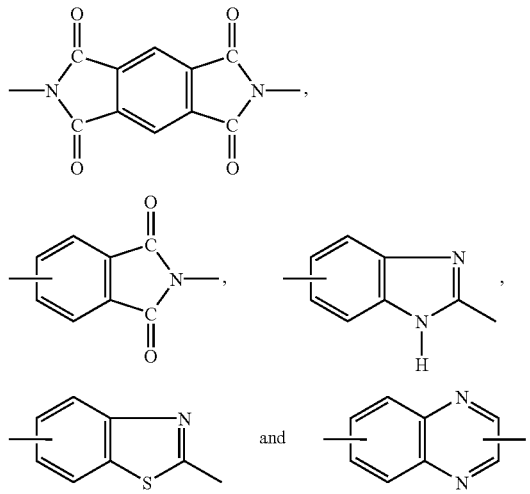

and the like. Examples of the structural unit Y are non-conjugated functional groups such as:

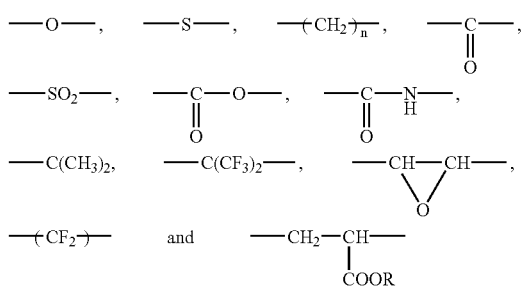

wherein R is an alkyl group, and conjugated functional groups such as:

—CH=CH—, —C=C—, —N=N— and —CH=N—.

Concretely resins having the following recurring units are preferred.

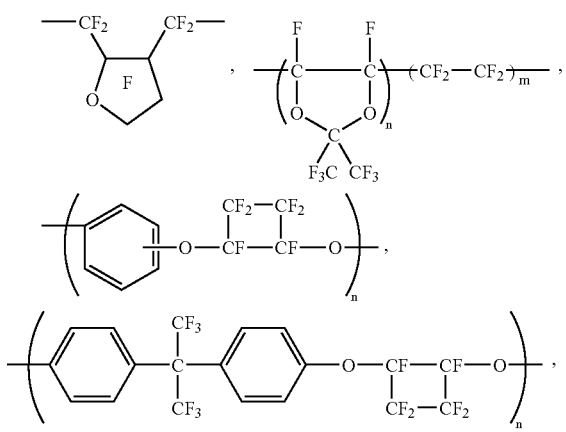

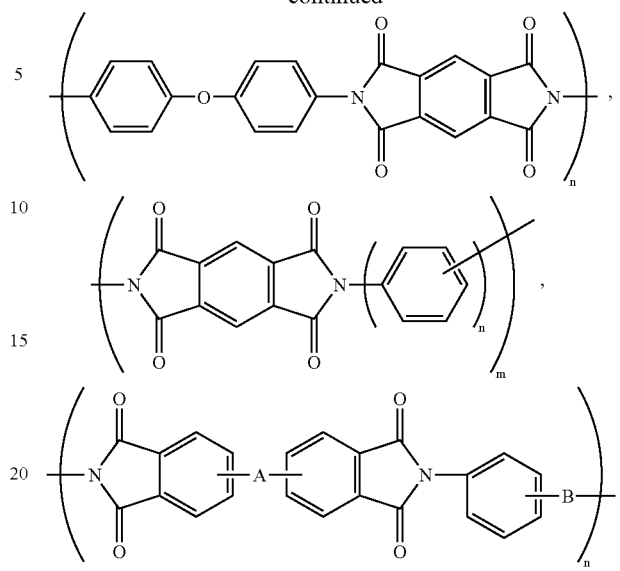

and the like, A is a single bond, —O— or —C(=O)—; B is a single bond, —O—, —S—, —C(=O)—, —CH$_2$— or —C(CF$_3$)$_2$—.

Also a filler may be contained in the coating layer. Plasma resistance is enhanced greatly when the filler is contained in the coating layer.

It is desired that the filler is selected from the viewpoint of its dispersibility in the resin for the coating layer, chemical resistance, moisture absorption, plasma resistance, electromagnetic wave resistance and the like. Example of the filler is at least one of metallic fillers such as metal oxide, metal nitride, metal carbide, halogenated metal, metal sulfide, metal salt and metal hydride and carbon fillers such as carbon black, graphitized carbon and graphite. From the viewpoint of excellent plasma resistance, metallic fillers are preferred particularly.

Examples of the metal oxide are, for instance, silicon oxide, barium oxide, titanium oxide, aluminum oxide, silver oxide, beryllium oxide, bismuth oxide, chromium oxide, boron oxide, cadmium oxide, copper oxide, iron oxide, gallium oxide, germanium oxide, hafnium oxide, iridium oxide, lanthanum oxide, lithium oxide, magnesium oxide, manganese oxide, molybdenum oxide, niobium oxide, neodymium oxide, nickel oxide, lead oxide, praseodymium oxide, rhodium oxide, antimony oxide, scandium oxide, tin oxide, strontium oxide, tantalum oxide, thorium oxide, vanadium oxide, tungsten oxide, zinc oxide, zirconium oxide and the like. Preferred are silicon oxide, titanium oxide and aluminum oxide from the viewpoint of excellent chemical resistance and chemical stability thereof. Also silicon oxide is particularly preferred from the point that an amount of HF generated from the fluorine-containing elastomer at heating at high temperatures can be inhibited.

Examples of the metal nitride are, for instance, lithium nitride, titanium nitride, aluminum nitride, boron nitride, vanadium nitride, zirconium nitride and the like. Preferred are titanium nitride and aluminum nitride from the viewpoint of excellent plasma resistance, chemical stability and industrial applicability thereof.

Examples of the metal carbides are, for instance, boron carbide, calcium carbide, iron carbide, manganese carbide, titanium carbide, silicon carbide, vanadium carbide, aluminum carbide and the like. Preferred are silicon carbide and titanium carbide from the viewpoint of excellent chemical resistance and chemical stability thereof.

Examples of the halogenated metal are, for instance, metal chlorides and metal fluorides such as silver chloride, silver fluoride, aluminum chloride, aluminum fluoride, barium chloride, barium fluoride, calcium chloride, calcium fluoride, cadmium chloride, chromium chloride, cesium chloride, cesium fluoride, copper chloride, potassium chloride, potassium fluoride, lithium chloride, lithium fluoride, magnesium chloride, magnesium fluoride, manganese chloride, sodium chloride, sodium fluoride, nickel chloride, lead chloride, lead fluoride, rubidium chloride, rubidium fluoride, tin chloride, strontium chloride, thallium chloride, vanadium chloride, zinc chloride and zirconium chloride, and bromides and iodides thereof. Preferred are aluminum fluoride and barium fluoride from the viewpoint of little moisture absorption and excellent chemical stability thereof.

The metal salts are those represented by the formula: MnAm (M is a metal, A is a residue of various inorganic acids, m and n are optionally decided depending on the valencies thereof, respectively). For example, there are sulfates, carbonates, phosphates, titanates, silicates, nitrates and the like of various metals. Examples thereof are, for instance, aluminum sulfate, barium carbonate, silver nitrate, barium nitrate, barium sulfate, barium titanate, calcium carbonate, calcium nitrate, calcium phosphate, calcium silicate, calcium titanate, cadmium sulfate, cobalt sulfate, copper sulfate, ferrous carbonate, iron silicate, iron titanate, potassium nitrate, potassium sulfate, lithium nitrate, magnesium carbonate, magnesium nitrate, magnesium silicate, magnesium titanate, magnesium carbonate, manganese sulfate, manganese silicate, sodium carbonate, sodium nitrate, sodium sulfate, sodium silicate, sodium titanate, nickel sulfate, lead carbonate, lead sulfate, strontium carbonate, strontium sulfate, strontium titanate, zinc carbonate, zinc sulfate, zinc titanate and the like. Preferred are barium sulfate and aluminum sulfate from the viewpoint of excellent plasma resistance and chemical stability thereof.

Examples of the metal hydrides are, for instance, calcium hydride, magnesium hydride and the like.

Examples of the metal sulfide are, for instance, silver sulfide, calcium sulfide, cadmium sulfide, cobalt sulfide, copper sulfide, iron sulfide, manganese sulfide, molybdenum disulfide, lead sulfide, tin sulfide, zinc sulfide, tungsten disulfide and the like.

Among them, the metallic fillers, particularly metal oxides, metal nitrides and metal carbides are particularly preferred generally from the viewpoint of little moisture absorption and excellent chemical resistance thereof.

In addition to enhancement of plasma resistance, it is preferable to optionally select the filler depending on other characteristics required. For example, in case of a molded article such as a sealing material for oxygen plasma equipment which is exposed to a strong oxygen plasma, silicon oxide, titanium oxide, aluminum oxide, aluminum fluoride, barium sulfate and the like are preferred, and in case of exposure to a fluorine plasma, aluminum oxide, aluminum fluoride, barium sulfate, aluminum nitride and the like are preferred. Further in case of a sealing material which is used at a part where a heat eliminating mechanism is provided to prevent overheating of the sealing material and is required to have heat conductivity, preferred are graphitized carbon black, graphite and the like. Further in case of a removable seal at a rotation part which is required to have low friction property, molybdenum disulfide, boron carbide and the like are preferred, and in case of a seal in a microwave guide system which is exposed to a high frequency electromagnetic wave, fillers such as aluminum oxide and silicon oxide which have low dielectric constant, low dielectric loss tangent and low dielectric loss are preferred. Also in case of reducing generation of anionic gas from the molded article, calcium carbonate, calcium hydride or silicon oxide which has a function as an acid acceptor is preferred. Those fillers may be used in a mixture of two or more thereof.

The filler may be in the form of particle or fiber (or whisker). In case of particles, a particle size is not limited particularly. From the viewpoint of uniform dispersibility and from the point that thin film can be formed, the particle size is not more than 5 μm, particularly not more than 1 μm, further not more than 0.5 μm. The lower limit of the particle size depends on kind of the filler.

Also from the viewpoint of dispersibility in the coating resin and enhancement of moisture absorption resistance, the filler may be surface-treated. As the surface treating agent, there can be used, for example, known silane surface treating agents (silylation agent, silicone oil, silane coupling agent) and the like.

Examples of the silylation agent are compounds having $R_3Si$ group (R is an alkyl group and the like). Preferred compounds are trimethylsilane, dimethyldichlorosilane, hexamethyldisilazane, N,O-bis (trimethylsilyl)acetamide, N-trimethylsilylamide, N,N'-bis(trimethylsilyl)urea, N-trimethylsilyldiethylamine, N-trimethylsilylimidazole, t-butyldimethylchlorosilane and the like.

Examples of the silicone oil are compounds represented by:

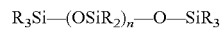

wherein R is an alkyl group, phenyl group, hydrogen atom or the like. Concretely dimethylsilicone and the like are preferred.

Examples of the silane coupling agent are compounds represented by $RSiX_3$, wherein R is a vinyl group, glycidoxy group, methacryloyl group, amino group, mercapto group or the like; X is an alkoxyl group, halogen atom or the like. Preferred examples thereof are, for instance, vinyltrichlorosilane, vinyltris(β-methoxyethoxy)silane, vinyltriethoxysilane, vinyltrimethoxysilane, γ-(methacryloyloxypropyl)trimethoxysilane, β-(3,4-epoxycyclohexyl)ethyltrimethoxysilane, γ-glycidyloxypropyltrimethoxysilane, γ-glycidyloxypropylmethyldiethoxysilane, N-β(aminoethyl)-γ-aminopropyltrimethoxysilane, N-β(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane and the like.

An adding amount of the filler is not limited particularly from the viewpoint of enhancement of plasma resistance. If the adding amount is too small, various intended hardness cannot be obtained. If the adding amount is too large, generation of micro-particles occurs, which results in pollution. Therefore the adding amount is from 5 to 80 parts by weight, preferably from 7 to 50 parts by weight based on 100 parts by weight of the coating resin.

With respect to the fluorine-containing elastomer substrate, the same explanation as in the first invention can be applied to its material, shape and molding method except the description of the surface roughness. Also it is desirable that the above-mentioned filler is added to the fluorine-containing elastomer from the viewpoint of enhancement of whole characteristics of the molded article. As a filler added to the fluorine-containing elastomer substrate, carbon fillers can be used sufficiently.

For example, when the coating resin composition is in the form of varnish, it can be applied to the fluorine-containing elastomer substrate by air doctor coating, blade coating, air knife coating, squeeze coating, dip coating, roll coating, cast coating, spray coating or the like, and in case of the composition being in the form of powder, it can be applied to the substrate by forming a coating layer by electrostatic coating, fluid bed coating or the like and then baking at a temperature of not less than a melting point or glass transition temperature of the resin forming the coating layer. In case of the form of varnish, in order to prevent generation of void due to rapid evaporation of an organic solvent, it is preferable to pre-heat at a temperature of not more than a boiling point of the organic solvent for sufficiently evaporating the solvent and then to bake at a temperature of not less than a melting point or glass transition temperature of the resin.

At forming a coating layer, in order to increase an adhesive strength, it is desirable to modify a surface of the fluorine-containing elastomer substrate. Examples of the surface modifying method are, for instance, physical and chemical treatment methods such as alkali treatment, glow discharge treatment, plasma irradiation treatment, UV irradiation treatment and ozone treatment, and mechanical treatment methods such as blasting treatment, scratching treatment, hair line treatment and honing treatment.

The purpose of the above-mentioned physical and chemical treatments is etching and/or hydrophilization of the surface of the fluorine-containing elastomer substrate, and on the other hand, the purpose of the mechanical treatment is roughening of the substrate surface.

In case of the surface roughening treatment, in order to enhance adhesive property, it is preferable to adjust the center line average roughness Ra to be not less than 0.6 µm, particularly not less than 0.65 µm.

The thus obtained coated molded article has an adhesive strength against peeling between the fluorine-containing elastomer substrate and the coating layer of more than 200 gf/10 mm, preferably not less than 300 gf/10 mm, and even if it is used as a sealing material, interface peeling does not arise easily.

An adhesive strength is measured according to JIS K6404-5.

The fluorine-containing elastomer molded article of the present invention having excellent detachability can be used for various applications.

Applications thereof as a sealing material are O-ring, square ring, gasket, packing, oil seal, bearing seal, lip seal and the like. Other applications thereof are various elastomer products, for example, diaphragm, tube, hose, various rubber rolls and the like. Also the molded article can be used as a coating material and lining material.

The molded article is suitable for a sealing material for semiconductor production apparatuses. In the present invention, the semiconductor production apparatuses are not limited particularly to apparatuses for producing semiconductors and encompass whole manufacturing equipment used in the field of semiconductors where a high degree of cleanliness is required, such as equipment for manufacturing a liquid crystal panel and plasma panel.

Examples of the semiconductor production apparatuses are as follows.

(1) Etching System
Dry Etching Equipment
  Plasma etching machine
  Reactive ion etching machine
  Reactive ion beam etching machine
  Sputter etching machine
  Ion beam etching machine
Wet etching equipment
Ashing equipment (2) Cleaning System
Dry etching cleaning equipment
  UV/$O_3$ cleaning machine
  Ion beam cleaning machine
  Laser beam cleaning machine
  Plasma cleaning machine
  Gas etching cleaning machine
Extractive cleaning equipment
  Soxhlet extractive cleaning machine
  High temperature high pressure extractive cleaning machine
  Microwave extractive cleaning machine
  Supercritical extractive cleaning machine (3) Exposing System
Stepper
Coater and developer (4) Polishing System
CMP equipment (5) Film Forming System
CVD equipment
Sputtering equipment (6) Diffusion and Ion Implantation System
Oxidation and diffusion equipment
Ion implantation equipment The present invention is then explained by means of examples, but is not limited to them.

EXAMPLE 1

A 3-liter stainless steel autoclave having no ignition source was charged with 1 liter of pure water, 10 g of:

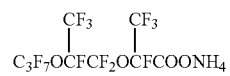

as an emulsifying agent and 0.09 g of disodium hydrogenphosphate·12$H_2O$ as a pH control agent. After the inside of a system was sufficiently replaced with nitrogen gas and deairing was carried out, the autoclave was heated to 50° C. with stirring at 600 rpm, and a gas mixture of tetrafluoroethylene (TFE)/perfluoro(methyl vinyl ether) (PMVE) (TFE/PMVE=25/75 in mole ratio) was introduced so that the inside pressure became 8.0 kgf/cm$^2$G. Then 10 ml of an aqueous solution of ammonium persulfate (APS) having a concentration of 527 mg/ml was introduced with pressurized nitrogen gas to initiate a reaction.

With the advance of the polymerization, at the time when the inside pressure was lowered to 7.0 kgf/cm$^2$G, 3 g of $CF_2$=CFOCF$_2$CF(CF$_3$)OCF$_2$CF$_2$CN(CNVE) was introduced with pressurized nitrogen gas. Then 4.7 g of TFE and 5.3 g of PMVE were introduced at the respective self-pressures so that the inside pressure became 8.0 kgf/cm²G. Thereafter with the advance of the reaction, pressurized TFE and PMVE were introduced similarly. Thus increasing and decreasing of the inside pressure were repeated between 7 kgf/cm²G and 8 kgf/cm²G, and in addition, 3 g of CNVE was introduced with pressurized nitrogen gas when a total amount of the introduced TFE and PMVE reached 70 g, 130 g, 190 g and 250 g, respectively.

Nineteen hours after starting of the polymerization, when a total amount of the introduced TFE and PMVE reached 300 g, the autoclave was cooled and an un-reacted monomer was released to obtain 1,330 g of an aqueous dispersion having a solid concentration of 21.2% by weight.

Then 1,196 g of the obtained aqueous dispersion was diluted with 3,588 g of water and added slowly to 2,800 g of an aqueous solution of 3.5% by weight of hydrochloric acid with stirring. After the addition, stirring was continued for five minutes and then a coagulated product was filtrated. The obtained polymer was put in 2 kg of HCFC-141b, followed by stirring for five minutes and filtrating again. After that, the washing with HCFC-141b and the filtration were repeated four times and vacuum drying was carried out at 60° C. for 72 hours to obtain 240 g of a polymer (nitrile group-containing elastomer).

As a result of $^{19}$F-NMR analysis, the obtained polymer was a polymer comprising TFE/PMVE/CNVE=56.6/42.3/1.1% by mole.

The obtained fluorine-containing elastomer (nitrile group-containing elastomer having carboxyl group at its end), 2,2-bis(3-amino-4-hydroxyphenyl) hexafluoropropane [Bis(aminophenol)AF] as a crosslinking agent and titanium oxide as a filler were mixed in a weight ratio of 100/3/30 and were kneaded in an open roll to obtain a crosslinkable fluorine-containing elastomer composition.

The obtained fluorine-containing elastomer composition was subjected to crosslinking at 200° C. for 15 to 20 minutes and then crosslinking in a 288° C. air oven for 24 hours. Thus 2 mm thick×10 mm wide×60 mm long sheet was obtained.

Then an oxygen plasma was generated using oxygen gas under the conditions of a gas flow of 200 sccm, a pressure of 300 mTorr, an output of 400 W and a frequency of 13.56 MHz and was irradiated to the obtained crosslinked fluorine-containing elastomer sheet for 15 minutes with a plasma irradiation device (PX-1000 available from Kabushiki Kaisha Samco International Kenkyusho).

After completion of the irradiation, the sheet was dipped in a 5% aqueous solution of HF for 15 minutes and then cleaned in a boiling pure water, followed by drying at 200° C. for 24 hours to obtain the molded article (sheet) of the present invention.

A center line average roughness Ra, peeling strength and whiteness W (Lab) of the sheet were measured by the methods mentioned supra. The results are shown in Table 1.

EXAMPLES 2 TO 5

The crosslinked fluorine-containing elastomer sheet produced in Example 1 was subjected to roughening treatment in the same manner as in Example 1 except that the irradiation time was changed as shown in Table 1. In Example 5, CF$_4$ was used as a plasma gas.

A center line average roughness Ra, peeling strength and whiteness W (Lab) of those fluorine-containing elastomer sheets subjected to roughening treatment were measured in the same manner as in Example 1. The results are shown in Table 1.

COMPARATIVE EXAMPLE 1

The crosslinked fluorine-containing elastomer sheet produced in Example 1 was subjected to cleaning in the same manner as in Example 1 except that plasma irradiation was not carried out.

A center line average roughness Ra, peeling strength and whiteness W (Lab) of the fluorine-containing elastomer sheet not subjected to roughening treatment were measured in the same manner as in Example 1. The results are shown in Table 1.

TABLE 1

| | Plasma irradiation conditions | | | | | Characteristics of molded article | | |
|---|---|---|---|---|---|---|---|---|
| | Kind of gas | Gas flow (sccm) | Pressure (mTorr) | Output (W) | Frequency (MHz) | Irradiation time (min) | Center line average roughness (μm) | Peeling strength (g/10 mm) | Whiteness W (Lab) |
| Ex. 1 | Oxygen | 200 | 300 | 400 | 13.56 | 15 | 0.68 | 181 | 71.16 |
| Ex. 2 | Oxygen | 200 | 300 | 400 | 13.56 | 30 | 0.83 | 0 | 76.26 |
| Ex. 3 | Oxygen | 200 | 300 | 400 | 13.56 | 45 | 0.85 | 0 | 83.44 |
| Ex. 4 | Oxygen | 200 | 300 | 400 | 13.56 | 60 | 0.87 | 0 | 83.45 |
| Ex. 5 | CF$_4$ | 200 | 300 | 400 | 13.56 | 60 | 0.84 | 0 | 68.45 |
| Com. Ex. 1 | None | — | — | — | — | — | 0.58 | 267 | 68.26 |

As it is clear from Table 1, the fluorine-containing elastomer molded article of the present invention subjected to roughening treatment is easily removable without sticking. Further when the molded article is treated with an oxygen plasma, a product having a high whiteness can be obtained.

EXAMPLE 6

The fluorine-containing elastomer obtained in Example 1, 2,2-bis(3,3-diaminophenyl)hexafluoropropane (hereinafter referred to as "Bistetraamine AF") as a crosslinking agent and titanium oxide as a filler were mixed in a weight ratio of 100/3/30 and were kneaded in an open roll to obtain a crosslinkable fluorine-containing elastomer composition.

The obtained fluorine-containing elastomer composition was subjected to crosslinking at 200° C. for 15 to 20 minutes and then crosslinking in a 288° C. air oven for 24 hours. Thus a 2 mm thick×10 mm wide×60 mm long sheet was obtained.

Then an oxygen plasma was generated using oxygen gas under the conditions of a gas flow of 200 sccm, a pressure of 300 mTorr, an output of 400 W and a frequency of 13.56 MHz and was irradiated to the obtained crosslinked fluorine-containing elastomer sheet for 15 minutes with a plasma irradiation device (PX-1000 available from Kabushiki Kaisha Samco International Kenkyusho).

After completion of the irradiation, the sheet was dipped in a 5% aqueous solution of HF for 15 minutes and then cleaned in a boiling pure water, followed by drying at 200° C. for 24 hours to obtain the molded article (sheet) of the present invention.

A center line average roughness Ra was measured in the same manner as in Example 1. The results are shown in Table 2.

As a material for forming a coating layer, a solution was prepared by dissolving 0.3% by weight of polyimide (molecular weight: about 2,000, heat resistance: 350° C. of thermal decomposition temperature:) represented by the formula (A-1):

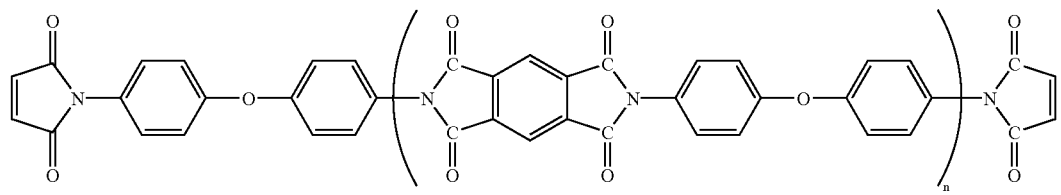

into N-methyl-2-pyrolidone and dispersing thereto 0.05% by weight (15 parts by weight based on 100 parts by weight of polyimide) of aluminum oxide (average particle size: 0.02 μm, trade name AKP-G008 available from Sumitomo Chemical Industries, Ltd.). Then in the solution was dipped the above-mentioned sheet to apply the solution on the surface of the sheet. The sheet in that state was heated at 80° C. for one hour, at 120° C. for one hour, at 180° C. for two hours and then at 300° C. for two hours, respectively. Those dipping and heating steps were repeated three times in total to obtain a coated molded article covered with a coating layer of polyimide on its surface.

The following properties of the coated sheet were evaluated. The results are shown in Table 2.

(Thickness of Coating Layer)

Measuring method: The thickness of the sheet after the coating (having coating layers on the top and bottom thereof is measured with a micro meter and the thickness of the sheet before the coating is subtracted from the obtained thickness of the coated sheet. The coating thickness is calculated by dividing the obtained value by 2 (average of three measurements at three points).

(Peeling Strength)

Measuring method: Conditions (1) mentioned supra.

(Oxygen ($O_2$) Plasma Etching Rate)

Measuring device: PX-1000 available from Kabushiki Kaisha Samco International Kenkyusho.

Measuring method: Conditions (2) mentioned supra.

(Interface Adhesive Strength)

Measuring method: According to JIS K6404-5.

EXAMPLE 7

A coated sheet was produced in the same manner as in Example 6 except that a fluorine-containing resin (molecular weight: 50,000, heat resistance: 240° C. of glass transition temperature) having a recurring unit represented by the formula (A-2):

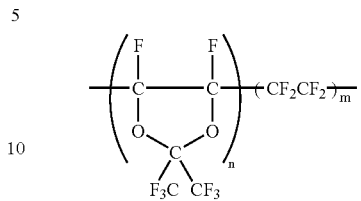

was used as a material for forming a coating layer instead of polyimide.

With respect to the obtained coated sheet, a peeling strength, oxygen plasma etching rate and interface adhesive strength were evaluated in the same manner as in Example 6. The results are shown in Table 2.

EXAMPLE 8

A coated sheet was produced in the same manner as in Example 6 except that a fluorine-containing resin (molecular weight: 72,000, heat resistance: 240° C. of glass transition temperature) having a recurring unit represented by the formula (A-3):

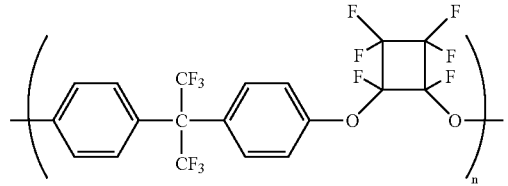

was used as a material for forming a coating layer instead of polyimide.

With respect to the obtained coated sheet, a peeling strength, oxygen plasma etching rate and interface adhesive strength were evaluated in the same manner as in Example 6. The results are shown in Table 2.

EXAMPLE 9

A coated sheet was produced in the same manner as in Example 6 except that the following alkali treatment was carried out instead of plasma treatment for the surface treatment of a fluorine-containing elastomer sheet.

With respect to the obtained coated sheet, a peeling strength, oxygen plasma etching rate and interface adhesive strength were evaluated in the same manner as in Example 6. The results are shown in Table 2.

(Surface Treatment with Alkali)

The fluorine-containing elastomer sheet is dipped for ten seconds in alkali etching agent (trade name TETRAETCH available from Junkosha Inc.) maintained at 25° C. Then the sheet is removed and is washed with methanol and then with pure water and is dried at 120° C. for two hours. As a result, water contact angle of the surface of the fluorine-containing elastomer sheet of Example 9 was decreased from 110 degrees to 50 degrees.

EXAMPLE 10

A coated fluorine-containing elastomer sheet was produced in the same manner as in Example 6 except that the same alkali treatment as in Example 9 was employed for the surface treatment of the sheet and a silica (average particle size: 0.02 μm, trade name: Cab-O-sil M-7D available from Cabot Specialty Chemicals Co., Ltd.) was used as a filler for a coating layer instead of aluminum oxide.

With respect to the obtained coated sheet, a peeling strength, oxygen plasma etching rate and interface adhesive strength were evaluated in the same manner as in Example 6. The results are shown in Table 2.

COMPARATIVE EXAMPLES 2 TO 4

Coated sheets were produced in the same manner as in Examples 6 to 8, respectively except that a filler was not added to materials for coating layers, and a peeling strength, oxygen plasma etching rate and interface adhesive strength were evaluated in the same manner as in Example 6.

The results are shown in Table 2.

TABLE 2

|  | Ex. 6 | Ex. 7 | Ex. 8 | Ex. 9 |
|---|---|---|---|---|
| Fluorine-containing elastomer substrate | Ex. 1 | Ex. 1 | Ex. 1 | Ex. 1 |
| Surface treatment method | Plasma treatment | Plasma treatment | Plasma treatment | Alkali treatment |
| Center line average roughness Ra (μm) | 0.68 | 0.68 | 0.68 | 0.58 |
| Coating layer Resin for coating layer |  |  |  |  |
| Structural formula | Formula (A-1) | Formula (A-2) | Formula (A-3) | Formula (A-1) |
| Heat resistance (° C.) | 350 (*1) | 240 (*2) | 240 (*2) | 350 (*1) |
| Filler |  |  |  |  |
| Kind | Alumina | Alumina | Alumina | Alumina |
| Particle size (μm) | 0.02 | 0.02 | 0.02 | 0.02 |
| Adding amount (based on 100 parts by weight of resin) | 15 parts by weight | 15 parts by weight | 15 parts by weight | 15 parts by weight |
| Thickness (μm) | 16 | 16 | 16 | 16 |
| Characteristics of coated molded article |  |  |  |  |
| Peeling strength (gf/10 mm) | 0 | 0 | 0 | 0 |
| Etching rate (nm/sec) | 8 | 10 | 9 | 8 |
| Interface peeling strength (gf/10 mm) | 220 | 300 | 350 | 2800 |

|  | Ex. 10 | Com. Ex. 2 | Com. Ex. 3 | Com. Ex. 4 |
|---|---|---|---|---|
| Fluorine-containing elastomer substrate | Ex. 1 | Ex. 1 | Ex. 1 | Ex. 1 |
| Surface treatment method | Alkali treatment | Plasma treatment | Plasma treatment | Plasma treatment |
| Center line average roughness Ra (μm) | 0.58 | 0.68 | 0.68 | 0.68 |
| Coating layer Resin for coating layer |  |  |  |  |
| Structural formula | Formula (A-1) | Formula (A-1) | Formula (A-2) | Formula (A-3) |
| Heat resistance (° C.) | 350 (*1) | 350 (*1) | 240 (*2) | 240 (*2) |
| Filler |  |  |  |  |
| Kind | Silica | None | None | None |
| Particle size (μm) | 0.02 | — | — | — |
| Adding amount (based on 100 parts by weight of resin) | 15 parts by weight | — | — | — |
| Thickness (μm) | 16 | 16 | 16 | 16 |
| Characteristics of coated molded article |  |  |  |  |
| Peeling strength (gf/10 mm) | 0 | 0 | 0 | 0 |
| Etching rate (nm/sec) | 9 | 14 | 19 | 17 |
| Interface peeling strength (gf/10 mm) | 2800 | 220 | 300 | 350 |

EXAMPLE 11

The respective coated sheets produced in Examples 9 and 10 were heated at 300° C. for 30 minutes and an amount of generated HF was measured. The amount of generated HF was 2.5 ppm in Example 9 where alumina (aluminum oxide) was added as a filler, and was not more than a detection limit (0.5 ppm) in Example 10 where silica (silicon oxide) was added as a filler.

INDUSTRIAL APPLICABILITY

According to the present invention, a fluorine-containing elastomer molded article having excellent detachability and excellent whiteness can be provided, and the molded article is a molded article suitably used as various sealing materials for semiconductor production apparatuses.

The invention claimed is:

1. A fluorine-containing elastomer molded article containing a fluorine-containing elastomer as a major component of the fluorine-containing elastomer molded article and a white filler and having a center line average roughness Ra of not less than 0.65 μm.

2. The molded article of claim 1 having a peeling strength of not more than 200 gf/10 mm as measured by the following method:

A sample molded article of 2 mm thick×10 mm wide×60 mm long is put between two stainless steel metal plates and a load is applied thereto uniformly, followed by allowing to stand at 150° C. for 72 hours in a state that the thickness of the molded article is compressed to 81.5%, and then air cooling in the compressed state; the molded article is then separated from the metal plate at a rate of 2 mm/mm and a peeling strength at that time is measured.

3. The molded article of claim 1, wherein the fluorine-containing elastomer is a copolymer of tetrafluoroethylene and perfluoro(alkyl vinyl ether).

4. The molded article of claim 1 having a whiteness W (Lab) of not less than 70.

5. The molded article of claim 1 which is a sealing material used for semiconductor production apparatuses in a compressed state.

6. A method of producing a fluorine-containing elastomer molded article containing a fluorine-containing elastomer as a major component of the fluorine-containing elastomer molded article and a white filler and having a center line average roughness Ra of not less than 0.65 μm, said method is characterized by irradiating the fluorine-containing elastomer molded article with a plasma.

7. The method of claim 6, wherein the plasma contains an oxygen gas.

8. A fluorine-containing elastomer molded article comprising a fluorine-containing elastomer substrate containing a fluorine-containing elastomer as a major component of the fluorine-containing elastomer substrate and a white filler, and a coating layer on a surface of the substrate, wherein the coating layer has a peeling strength of not more than 200 gf/10 mm as measured under the following Conditions (1) and an etching rate of not more than 13 nm/sec when irradiating the molded article with an oxygen plasma as measured under the following Conditions (2):

Conditions (1)
  A coated sheet of 2 mm thick×10 mm wide×60 mm long is put between two stainless steel metal plates and a load is applied thereto uniformly, followed by allowing to stand at 150° C. for 72 hours in a state that the thickness of the coated sheet is compressed to 81.5%, and then air cooling in the compressed state; the coated sheet is then separated from the metal plate at a rate of 2 mm/mm and a peeling strength between the surface coated layer and the metal plate at that time is measured;

Conditions (2)
Irradiation conditions:
Oxygen ($O_2$) plasma irradiation treatment
  Gas flow: 16 sccm
  RF output: 800 W
  Pressure: 20 mTorr
  Frequency: 13.56 MHz
Irradiation operation:
  In order to stabilize an atmosphere in a chamber of a plasma irradiation device, discharging actually with an oxygen plasma is carried out for five minutes for pre-treatment inside the chamber; then the coated sheet is disposed around a center of RF electrode, and is irradiated under the above-mentioned irradiation conditions:
Measurement of etching rate:
  An amount of weight reduction per unit area is measured up to two decimals (0.01 mg) with an electronic balance, and is round to one decimal; the measured amount of weight reduction per unit area is substituted for the following equation to calculate an etching rate:
Etching rate (nm/sec)
  =Amount of weight reduction per unit area ($g/cm^2$)
  ÷Specific weight of a resin to be coated ($g/cm^3$)
  ÷Plasma irradiation time (sec)×$10^7$.

9. The molded article of claim 8, wherein the surface coating layer is a resin layer which is formed using a resin having heat resistance of not less than 200° C. and has a thickness of not more than 50 μm.

10. The molded article of claim 8, wherein an adhesive strength between the fluorine-containing elastomer substrate and the surface coating layer is larger than 200 gf/10 mm.

11. The molded article of claim 8, wherein the surface coating layer contains at least one filler selected from the group consisting of metal oxides, metal nitrides, metal carbides, metal salts, metal hydrides, halogenated metals and metal sulfides.

12. The molded article of claim 8, wherein a center line average roughness Ra of a surface of the fluorine-containing elastomer substrate is not less than 0.6 μm.

13. The molded article of claim 8, wherein the fluorine-containing elastomer substrate is obtained from a copolymer of tetrafluoroethylene and perfluoro(alkyl vinyl ether).

14. The molded article of claim 8, wherein the fluorine-containing elastomer substrate contains at least one filler selected from the group consisting of metal oxides, metal nitrides, metal carbides, metal salts, metal hydrides, halogenated metals, metal sulfides, carbon black, graphitized carbon black and graphite.

15. The molded article of claim 2, wherein the fluorine-containing elastomer is a copolymer of tetrafluoroethylene and perfluoro(alkyl vinyl ether).

16. The molded article of claim 2 having a whiteness W (Lab) of not less than 70.

17. The molded article of claim 2 which is a sealing material used for semiconductor production apparatuses in a compressed state.

18. A method of producing a fluorine-containing elastomer molded article containing a fluorine-containing elastomer as a major component of the fluorine-containing elastomer molded article and a white filler and having a center line average roughness Ra of not less than 0.65 μm and a peeling strength of not more than 200 gf/10 mm, said method is characterized by irradiating the fluorine-containing elastomer molded article with a plasma.

19. The method of claim 18, wherein the plasma contains an oxygen gas.

* * * * *